US012715769B2

(12) United States Patent
Forsberg et al.

(10) Patent No.: US 12,715,769 B2
(45) Date of Patent: Aug. 25, 2026

(54) METHOD FOR THE SYNTHESIS OF NITROGEN OXIDES AND NITRIC ACID IN A THERMAL REACTOR

(71) Applicant: NITROCAPT AB, Uppsala (SE)

(72) Inventors: Gustaf Forsberg, Orsundsbro (SE); Peter Baeling, Ekero (SE); Gerard Jacobus Van Rooij, Utrecht (NL)

(73) Assignee: NITROCAPT AB, Uppsala (SE)

(*) Notice: Subject to any disclaimer, the term of this patent is extended or adjusted under 35 U.S.C. 154(b) by 72 days.

(21) Appl. No.: 18/273,195

(22) PCT Filed: Jan. 18, 2022

(86) PCT No.: PCT/SE2022/050051
§ 371 (c)(1),
(2) Date: Jul. 19, 2023

(87) PCT Pub. No.: WO2022/159018
PCT Pub. Date: Jul. 28, 2022

(65) Prior Publication Data

US 2024/0114172 A1 Apr. 4, 2024
US 2026/0143165 A2 May 21, 2026

(30) Foreign Application Priority Data

Jan. 19, 2021 (SE) .................................... 2150049-1

(51) Int. Cl.
*H04N 19/70* (2014.01)

(52) U.S. Cl.
CPC .................................... *H04N 19/70* (2014.11)

(58) Field of Classification Search
CPC ...................................................... H04N 19/70
See application file for complete search history.

(56) References Cited

U.S. PATENT DOCUMENTS 3,393,047 A * 7/1968 Steinmetz-Schmaltz .................... C01B 21/36 423/402
4,267,027 A 5/1981 Amouroux et al.
4,469,508 A 9/1984 Amouroux et al.
5,165,900 A * 11/1992 Miksitz ...................... B01J 8/08 422/219

(Continued)

FOREIGN PATENT DOCUMENTS

CH 645321 A5 9/1984
CN 104981603 * 3/2014

(Continued)

OTHER PUBLICATIONS

Tanaka translation of WO 2018230737 Jun. 15, 2018 (Year: 2018).*

(Continued)

*Primary Examiner* — Zaihan Jiang
(74) *Attorney, Agent, or Firm* — Stites & Harbison PLLC; Richard S. Myers, Jr.

(57) ABSTRACT

There is provided a method for deriving a value for a first syntax element, Syntax_A. The method comprises determining whether Syntax_A is present in a bitstream. The method comprises, as a result of determining that Syntax_A is not present in the bitstream, deriving the value for Syntax_A to be equal to a first value, B, if a first condition is satisfied, or deriving the value for Syntax_A to be equal to a second value, C, if a second condition is satisfied.

14 Claims, 2 Drawing Sheets

(56) References Cited

U.S. PATENT DOCUMENTS

| | | | | |
|---|---|---|---|---|
| 11,555,434 | B1 * | 1/2023 | Khaled | F01N 3/00 |
| 2014/0365195 | A1 * | 12/2014 | Lahiri | G05B 23/024 703/12 |
| 2024/0367136 | A1 * | 11/2024 | Husain | B01J 19/0033 |
| 2024/0369993 | A1 * | 11/2024 | Lahiri | G05B 19/4155 |

FOREIGN PATENT DOCUMENTS

| | | | |
|---|---|---|---|
| DE | 102015216851 | * | 9/2015 |
| GB | 100099 | A | 1/1917 |
| GB | 728392 | A | 4/1955 |
| GB | 855191 | | 11/1960 |
| JP | S58195780 | A | 11/1983 |
| WO | WO-2012150865 | * | 4/2012 |
| WO | WO2012150865 | A1 | 11/2012 |
| WO | WO2016063302 | A2 | 4/2016 |
| WO | WO-2018230737 | * | 6/2018 |
| WO | WO2020115473 | A1 | 6/2020 |

OTHER PUBLICATIONS

Angst translation of DE 102015216851 Sep. 3, 2015 (Year: 2015).*
Hosono translation of CN 104981603 Mar. 18, 2014 (Year: 2014).*
Atroshchenko: “Technology of nitric acid”, Jan. 1, 1970 (Jan. 1, 1970), pp. 9-65.

* cited by examiner

METHOD FOR THE SYNTHESIS OF NITROGEN OXIDES AND NITRIC ACID IN A THERMAL REACTOR

CROSS REFERENCE TO RELATED APPLICATIONS

This application is a § 371 National Phase Application of PCT/SE2022/050051 filed Jan. 18, 2022, which claims priority to SE2150049-1 filed Jan. 19, 2021.

TECHNICAL FIELD

The present disclosure relates to the production of nitrogen oxides ($NO_x$) and in particular to production of NO, $NO_2$ and $HNO_3$.

BACKGROUND

Nitrogen oxides ($NO_x$) are regularly used in production of nitric acid, which is used for the production of ammonium nitrate, a major component of fertilizers, for the production of explosives, as solvents and for other chemical processes, as well as for bleaching and sterilization. Nitrogen is a key element for plants and therefore one of the most important nutrients in fertilizers. In the last century, nitrogen-containing fertilizers have been produced from atmospheric nitrogen essentially through the Haber-Bosch process to produce ammonia from hydrogen originating from fossil-based steam reforming and molecular nitrogen followed by the Ostwald process to produce nitric acid through oxidation of the ammonia. The nitric acid is then used for example as a source for producing nitrate fertilizers.

Alternatively, nitric acid can be produced through nitrogen fixation through the Birkeland-Eyde process, invented in 1903. By the aid of an electric arc, a thermal oxidation of atmospheric nitrogen into NO is conducted, and the NO spontaneously converts to $NO_2$ as the gas is cooled in the presence of oxygen. $NO_2$ is subsequently scrubbed with water and, thereby, converted into nitric acid. However, the thermal oxidation of nitrogen gas is highly energy demanding and therefore the Haber-Bosch and Ostwald processes became the leading processes used commercially to fix nitrogen from the air and to produce nitric acid.

Due to the emissions of greenhouse gases ($CO_2$, NO, $N_2O$) from the steam reforming and Haber-Bosch process combined with the Ostwald process, thermal oxidation of nitrogen has returned as an interesting option. However, due to the high energy demands of the Birkeland-Eyde process, there are improvements to be made especially regarding energy efficiency.

SUMMARY

One objective is to make available an essentially carbon neutral and industrially feasible method being a more energy efficient route compared to previous thermal oxidation methods for producing nitrogen oxides ($NO_x$) as well as nitric acid ($HNO_3$).

There is thus, as a first aspect of the present disclosure, provided a method for the synthesis of nitrogen oxides ($NO_x$) comprising the following steps:

There is also provided, as a second aspect of the present disclosure, a method for the synthesis of nitric acid ($HNO_3$) comprising the following steps:

providing a gas mixture comprising oxygen and nitrogen;

heating the gas mixture to a temperature of at least 2300 K at a pressure of 10-100 bar in a thermal reactor forming a gas mixture comprising $NO_x$;

cooling the gas mixture in a cooling step forming a cooled gas mixture comprising $NO_2$, wherein the cooling step comprises quenching the gas mixture comprising $NO_x$;

optionally, depressurizing the cooled gas mixture comprising $NO_2$;

wet scrubbing the gas mixture comprising $NO_2$ forming $HNO_3$; and optionally, recirculating unreacted exhaust gas from the wet scrubbing to the thermal reactor.

The combination of temperature and pressure decreases the energy consumption in the formation of $NO_x$ from oxygen and nitrogen gas. The inventors have found that by applying a pressure of 10-100 bar and a temperature above 2300 K there is a pronounced effect of reduction of the energy needed for formation of $NO_x$.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The method steps disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

Detailed descriptions of the drawings are presented below.

DETAILED DESCRIPTION

As a first aspect of the present disclosure, there is provided a method for the synthesis of nitrogen oxides ($NO_x$) comprising the following steps:

In the gas mixture comprising oxygen and nitrogen, the oxygen is typically oxygen gas ($O_2$) and the nitrogen is typically nitrogen gas ($N_2$).

By nitrogen oxides ($NO_x$) is meant compounds produced by reacting nitrogen and oxygen. Typically, the nitrogen oxides are nitric oxide (NO) and/or nitrogen dioxide ($NO_2$). Principally, the $NO_x$ formed by heating the gas mixture comprising oxygen and nitrogen to a temperature of at least 3000 K at a pressure of 10-100 bar in a thermal reactor is NO.

The thermodynamic balance in formation of $NO_2$ from $N_2$ and $O_2$ is:

$$N_2+O_2 \rightleftharpoons 2NO \quad (1)$$

$$2NO+O_2 \rightleftharpoons NO_2 \quad (2)$$

Figure 3:
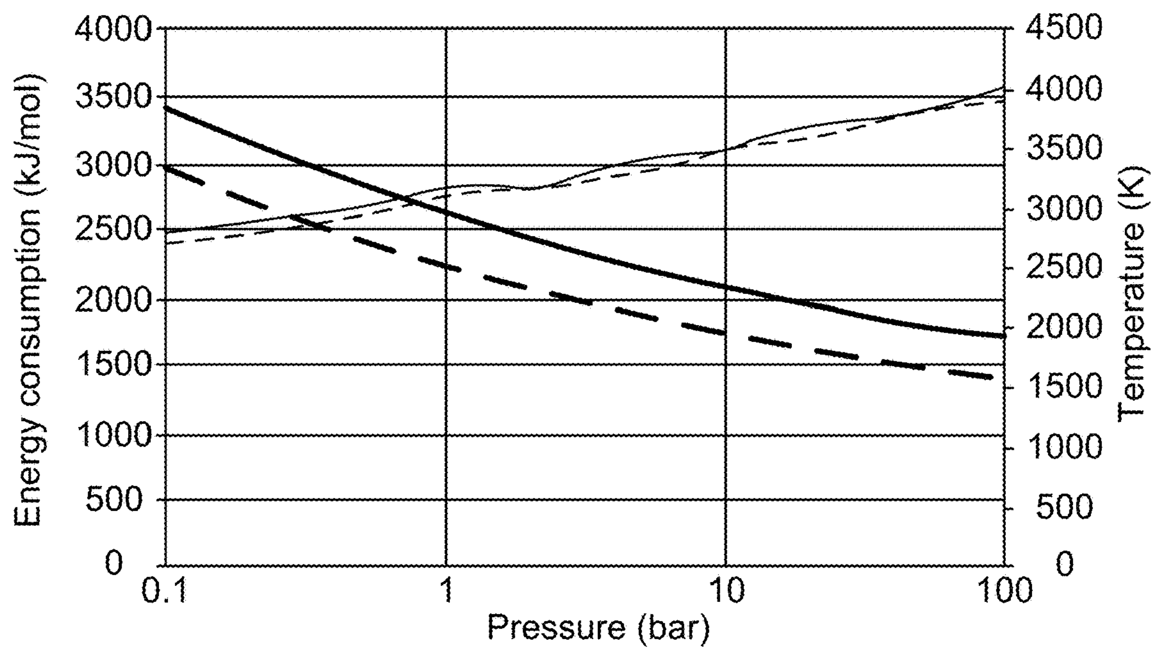
FIG. 3 shows the results from a simulation of the formation of NO from $N_2$ and $O_2$ at increasing temperature and pressure.
Figure 4:
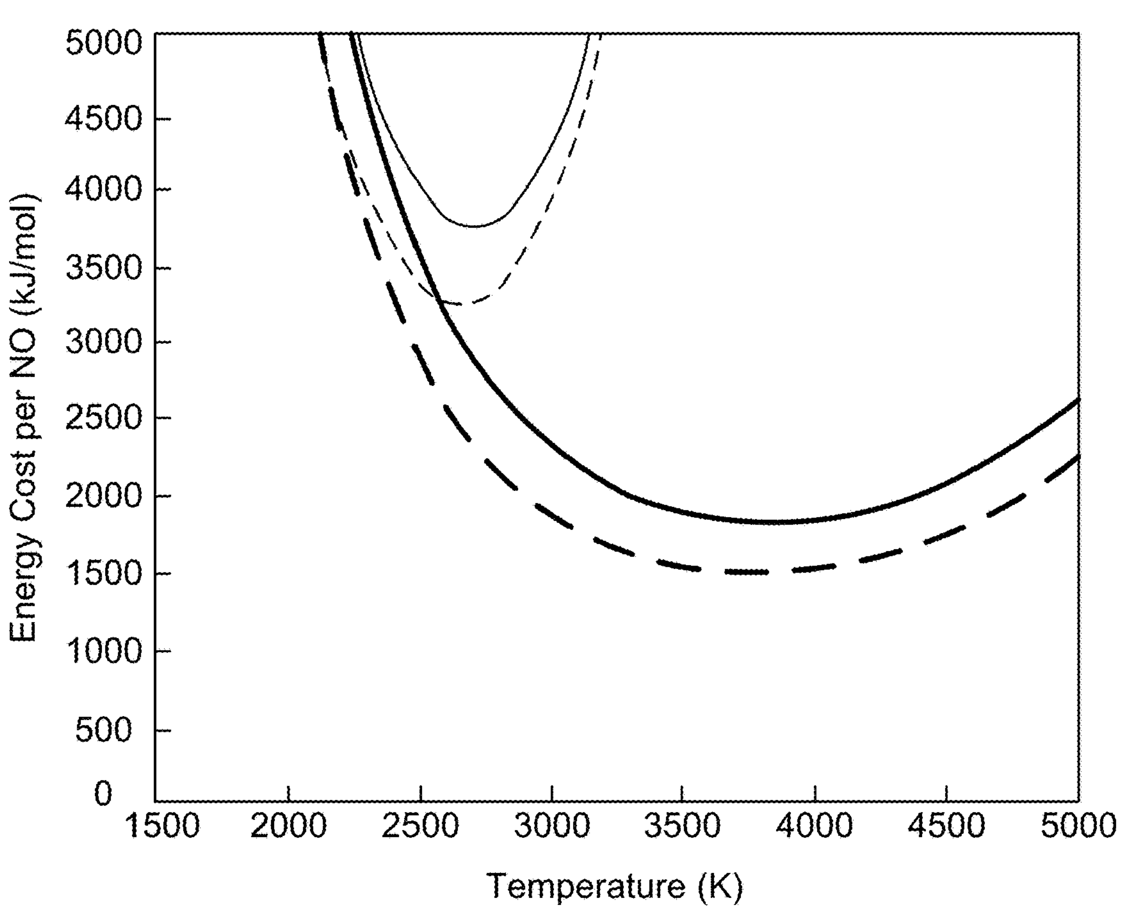
FIG. 4 shows the results from a simulation of the formation of NO from $N_2$ and $O_2$ at 0.05 bar and 50 bar.

The energy consumption for the formation of the $NO_x$, NO, from nitrogen and oxygen is significantly reduced upon application of a pressure above 10 bar. This is shown in FIGS. 3-4, and further laid out in the example.

The yield, i.e. the equilibrium concentration of NO in reaction step (1), in the formation of NO is typically up to 11%, such as 4-10%.

The pressure of the gas mixture comprising oxygen and nitrogen is 10-100 bar, preferably 15-70 bar, more preferably 15-60 bar, even more preferably 15-50 bar. In some embodiments, the pressure may be above 20 bar, such as 23-100 bar, such as 23-70 bar. The increase in pressure is typically obtained by compressing the gas mixture in a compressor.

The temperature of the gas mixture comprising oxygen and nitrogen is at least 2300 K, preferably at least 2500 K, more preferably at least 2800 K, even more preferably at least 3000 K. Moreover, the temperature is preferably at most 4500 K, more preferably at most 4000 K, wherein the upper limits are freely combinable with the lower limits, such that the temperature of the gas mixture comprising oxygen and nitrogen is preferably 2300 K-4500 K, more preferably 2300 K-4000 K, even more preferably, 2500 K-4500 K, even more preferably, 2500 K-4000 K, even more preferably 2800 K-4500 K, even more preferably, 2800 K-4000 K, even more preferably 3000 K-4500 K, even more preferably, 3000 K-4000 K.

The thermal reactor is typically constructed in a material that is both temperature resistant and mechanically resistant, capable of withstanding both the load from the pressure difference and the temperature. Examples of such material include MgO or the composite HfB2/20% SiC that has a high oxidation resistance and can resist temperatures above 2100 K. Further examples can be found in the article "Super-strong materials for temperatures exceeding 2000° C., L. Silvestroni et al., Sci Rep. 2017; 7".

Alternatively, the reactor wall can be cooled to a temperature where it has enough strength to carry the pressure difference. Special flow schemes can also be used so that the contact between the hot gas from the plasma with the reactor wall can be avoided or minimized. The "reversed vortex flow" is one example of such gas flow schemes.

Examples of reactor set-ups that can be used include the setup described by Hans-Peter Schmidt and Günter Speckhofer (Schmidt, H-P., and G. Speckhofer. "Experimental and theoretical investigation of high-pressure arcs. I. The cylindrical arc column (two-dimensional modeling)." IEEE Transactions on plasma science 24.4 (1996): 1229-1238.), where a gas plasma reactor reaching argon temperatures above 20 000 K at a pressure of 100 bar was created in a bell-shaped Pyrex® glass. Another example of a reactor is available from HiiROC Ltd, UK, capable of producing a plasma at a pressure of 50 bar.

The thermal reactor is preferably a plasma reactor. By plasma reactor is meant a reactor where the temperature applied in the reactor contributes to reaching conditions where the gas can be ionized and, at least partially, form a plasma.

The thermal reactor is preferably operated by heating the gas mixture comprising oxygen and nitrogen with radiofrequency waves or microwaves. The radiofrequency waves or microwaves transfer energy to the gas molecules. In such a case, a radiofrequency wave plasma or a microwave plasma, can be formed in a thermal reaction zone. If a plasma is formed, the radiofrequency wave or microwave energy input couples primarily with the dissociated electrons in the plasma. The radiofrequency waves or microwaves also transfer energy to the molecules. The use of radio waves or microwaves is beneficial since it is possible to focus the energy to a sector, in principle an arbitrary sector, of the reactor without requiring that any electrodes are in direct contact with the heated thermal reaction zone. If the electrodes are required to be in the vicinity of the thermal reaction zone, or even in direct contact, the electrodes may become so hot that they are consumed. One alternative solution is to limit the temperature, but that will reduce the efficiency of the process.

The gas mixture comprising oxygen and nitrogen typically has an oxygen content of 25-60% (vol/vol), preferably 25-55% (vol/vol). Such oxygen content decreases the energy input needed due to a more balanced formation of $NO_x$. Such oxygen content is typically provided by running a gas mixture comprising oxygen and nitrogen, such as air, through an oxygen sieve or oxygen enriching device. Molecular sieves for separating/enriching gases are well-known to persons skied in the art, and available from commercial suppliers. Alternatively, the gas mixture comprising oxygen and nitrogen has an oxygen content of 20-25% (vol/vol) that is advantageous because it avoids the need for enriching the gas mixture with oxygen.

The gas mixture comprising the formed $NO_x$ is typically cooled in a cooling step forming a cooled gas mixture comprising $NO_2$, wherein the cooling step comprises quenching the gas mixture comprising $NO_x$.

The quenching is typically conducted until obtaining a temperature sufficiently low so that the $NO_x$ in the cooled gas mixture principally is NO and the NO essentially does not reverse into $N_2$ and $O_2$ according to the equilibrium (1). The quenching is typically conducted directly downstream from the thermal reaction in the thermal reactor. Typically, the gas mixture comprising $NO_x$ is quenched by lowering the temperature below 2200 K, preferably below 2000 K, more preferably below 1900 K, even more preferably below 1700 K.

In one embodiment, the gas mixture is quenched to a temperature below 750 K, preferably to a temperature below 373 K, more preferably to a temperature between 293-363 K, wherein the formation of $NO_2$ in accordance with equilibrium (2) is promoted.

In an alternative embodiment, the gas mixture is quenched followed by a second cooling step, wherein in said second cooling step the gas mixture is cooled to a temperature below 750 K, preferably to a temperature below 373 K, more preferably to a temperature between 293-363 K. The second cooling step typically cools at a cooling rate being at least 10% lower than the cooling rate of the quenching. In such an embodiment, the formation of $NO_2$ in accordance with equilibrium (2) is promoted during the second cooling step. The lower cooling rate of the second cooling step is beneficial since energy recovery is facilitated.

Preferably, the quenching is conducted by bringing the gas mixture in contact with a quenching medium. The quenching medium is preferably water or a gas mixture comprising oxygen and nitrogen. Typically, the gas mixture comprises oxygen, nitrogen and NO recirculated from the cooling step and/or oxygen and nitrogen that was deliberately by-passed the thermal reactor. In the case where the gas mixture comprises oxygen, nitrogen and NO recirculated from the cooling step, the gas is preferably recirculated back after conducting the quenching to be mixed with gas from the thermal reactor. This is beneficial since it is energy efficient. Alternatively, the gas is recirculated back after the complete cooling step. Prior to being used as quenching medium, i.e. mixed with gas from the reactor, the gas mixture is typically cooled in a heat-exchanger capable of recovering energy for example by the generation of steam to be used in a steam turbine e.g. to produce electricity. The cooled gas mixture is thereafter injected into the quenching step. Such gaseous quenching medium is beneficial since the energy efficiency is higher compared with water as quenching medium since no energy is needed to vaporize water. Moreover, if a turbine is used, the risk of water in the turbine is reduced.

Water as quenching medium is beneficial particularly when no turbine is used. In such a case, water is added to the gas through sprinklers with the purpose of conserving the NO equilibrium content in the gas mixture comprising $NO_x$ according to equilibrium (1).

In the cooling step, the gas mixture is typically depressurized, preferably during the second cooling step subsequent to quenching. Alternatively, the pressure is maintained throughout the cooling step. In such a case, $HNO_3$ can be produced at high pressure, extracted from the process to atmospheric pressure while the exhaust gas can be recirculated to the reactor.

While the temperature is lowered in the cooling step, energy can be extracted from the gas mixture. At least part of the extraction of energy is conducted in a turbine system, wherein the turbine system preferably comprises a cooler or condenser. A system comprising a compressor pumping in the gas mixture comprising oxygen and nitrogen to maintain the pressure, and a turbine placed downstream after the thermal reactor is beneficial. It has been estimated that by using a compressor and turbine in combination, it is possible to recover approx. 40-45% of the energy put into the system, however depending on for example the scale of application.

According to an alternative embodiment, the cooling step is performed by leading the gas mixture comprising $NO_x$ into a heat-exchanger of suitable dimensions. The heat-exchanger can be operated to produce steam either directly, or via a secondary circulation. The produced steam can be used for heating purposes, or for the generation of electricity in a steam turbine.

The gas mixture comprising $NO_2$ is wet scrubbed forming $HNO_3$. The wet scrubbing is preferably conducted after the cooling step.

In one embodiment, the cooling step is conducted and followed downstream by wet scrubbing without depressurizing with for example a turbine. This can facilitate recirculation of unreacted exhaust gas to the reactor, as the pressure will not drop significantly, and less energy is needed to re-pressurize the gas to the desired pressure for the thermal reactor. Moreover, $HNO_3$ can be produced at high pressure, and typically it is only the $HNO_3$ extracted from the process that is depressurized to atmospheric pressure. In addition, since liquids are in general incompressible, the loss of work is kept low.

Typically, unreacted exhaust gas is recirculated from the scrubber to the thermal reactor and may be conducted both if the gas mixture is maintained at high pressure or has been depressurized. Recirculation is beneficial since the recirculated gas mixture already has an elevated oxygen content so only the amount of $N_2$ and $O_2$ that has been reacted has to be introduced from the exterior. In the case where the gas mixture is maintained at high pressure a further advantage is that due to the lower amount of new gas provided and the gas already being pressurized, the demand for large compressors is reduced. Similarly, the need for a large turbine can be reduced since the gas does not have to be depressurized. In the case where the gas has been depressurized, the gas is recirculated after depressurizing in for example a turbine. In such a case, a compressor is applied, but the capacity of the oxygen sieve/oxygen enriching device can be reduced compared to without recirculation. It is estimated that approx. 10% of the capacity is needed.

As a second aspect of the present disclosure, there is provided a method for the synthesis of nitric acid ($HNO_3$) comprising the following steps:

- providing a gas mixture comprising oxygen and nitrogen;
- heating the gas mixture to a temperature of at least 2300 K at a pressure of 10-100 bar in a thermal reactor forming a gas mixture comprising $NO_x$;
- cooling the gas mixture in a cooling step forming a cooled gas mixture comprising $NO_2$, wherein the cooling step comprises quenching the gas mixture comprising $NO_x$;
- optionally, depressurizing the cooled gas mixture comprising $NO_2$;
- wet scrubbing the gas mixture comprising $NO_2$ thereby forming $HNO_3$; and
- optionally, recirculating unreacted exhaust gas from the wet scrubbing to the thermal reactor.

What is described above with respect to the first aspect applies to the second aspect mutatis mutandis.

The aspects of the present disclosure will now be described hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figures 1, 2:
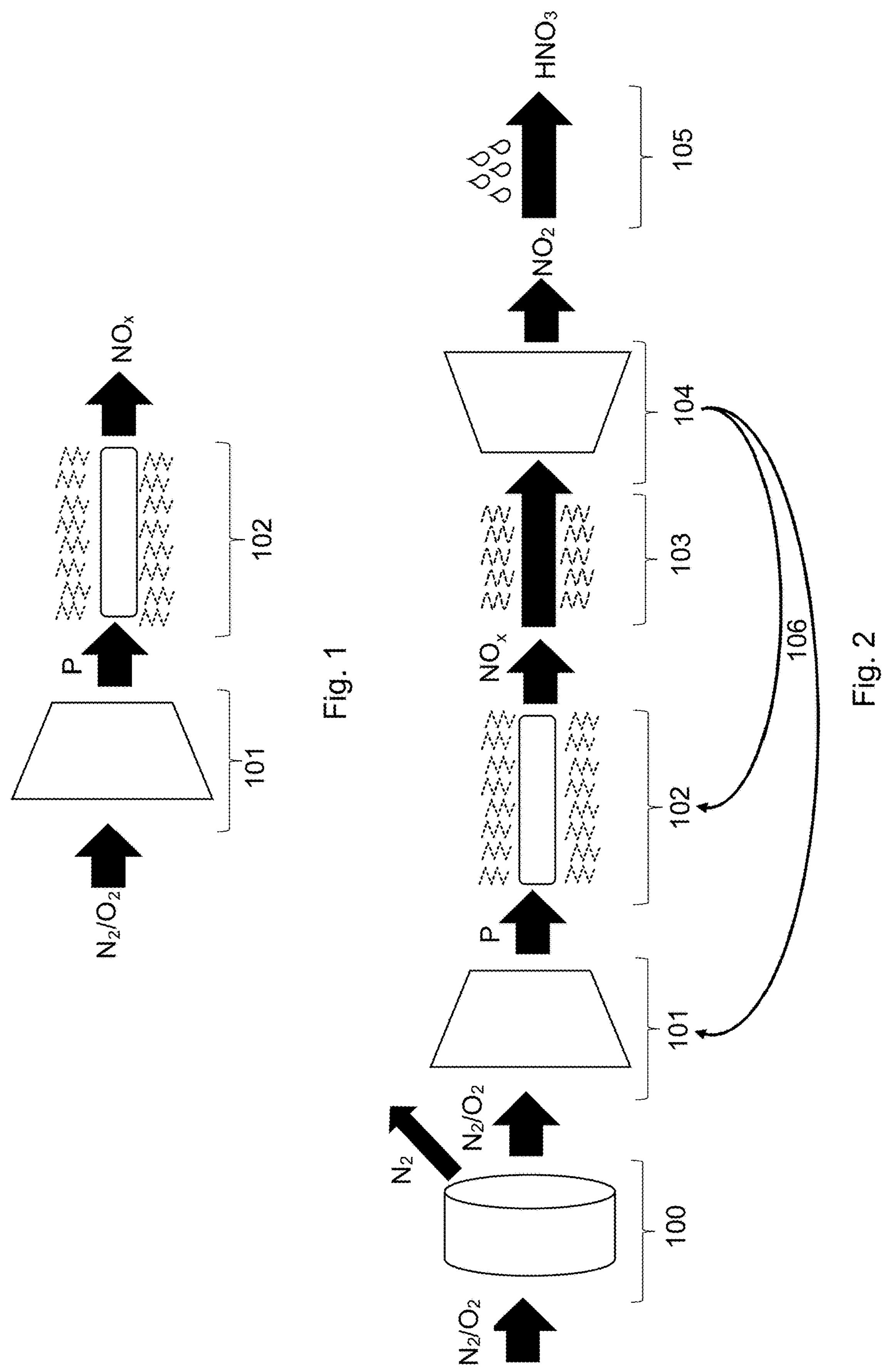
FIG. 1 shows a schematic image of a process for the synthesis of nitrogen oxides ($NO_x$).
FIG. 2 shows a schematic image of a process for the synthesis of $HNO_3$. including an oxygen sieve/oxygen concentrator, a turbine and a scrubber.

FIG. 1 shows a schematic image of a process for the synthesis of nitrogen oxides comprising providing a gas mixture comprising oxygen ($O_2$) and nitrogen ($N_2$); compressing the gas mixture in a compressor 101 into a pressure P and heating the compressed gas mixture in a thermal reactor 102 to form a gas mixture comprising $NO_x$.

FIG. 2 shows a schematic image of a process for the synthesis of nitric acid ($HNO_3$). The process comprises the steps of:

- providing a gas mixture comprising oxygen ($O_2$) and nitrogen ($N_2$);
- increasing the oxygen content in the gas mixture in an oxygen sieve 100;
- compressing the gas mixture in a compressor 101 into a pressure P;
- heating the compressed gas mixture in a thermal reactor 102 to form a gas mixture comprising $NO_x$;
- cooling the gas mixture by quenching in a quencher 103;
- depressurizing the gas in a turbine with a generator 104 to form depressurized $NO_2$ while recovering energy 106 to the compressor and/or thermal reactor; and
- wet scrubbing the $NO_2$ in a scrubber 105 thereby forming $HNO_3$.

EXAMPLE

Simulation of the Formation of NO from $N_2$ and $O_2$ at Increasing Temperature and Pressure The simulation was performed using MATLAB HGS Chemical Equilibrium Calculation code, which is an implementation of NASA Computer program CEA. It minimizes the Gibbs free energy for the specified temperature, pressure, and reactants, to arrive at an equilibrium composition. Details are found in: S. Gordon, B. J. McBride, NASA Reference Publication 1311, 1994; and in B. J. McBride, S. Gordon, NASA Reference Publication 1311, 1996.

The simulations were conducted for a stochiometric gas mixture of $N_2$ and $O_2$, i.e. 50% $N_2$ and 50% $O_2$ (vol/vol), as well as a gas mixture similar to that of air having 80% $N_2$ and 20% $O_2$ (vol/vol). Calculations were made for every 100 K increase in temperature.

The results are presented in FIG. 3. The lines representing the stochiometric gas mixture are dashed and the lines representing the gas mixture similar to air are unbroken. The fine lines (the lines going upwards as the pressure increases) show the temperature at which the energy consumption is the lowest per kg NO, while the bold lines (the lines going downwards) show the optimized energy consumption (kJ/mol) for the formation of NO at a given temperature (shown by the line of regular thickness going upwards) and pressure.

Nitrogen oxide formation in a plasma is limited by the thermodynamic equilibrium concentration that is approached in the thermal core of the plasma. The graph in FIG. 3 depicts how the thermodynamic equilibrium limitation improves towards pressure. The plasma reactor performance will qualitatively follow this trend with pressure.

In Table 1 the data for the optimized energy consumption for both gas mixtures are presented at three different pressures: 1, 10 and 50 bar.

TABLE 1

Optimized energy consumptions for the formation of NO from $N_2$ and $O_2$.

| Gas mixture (vol/vol ratio) | Pressure (bar) | Optimized energy consumption at a certain pressure (kJ/mol) | Temperature (K) |
|---|---|---|---|
| 80:20-$N_2$:$O_2$ | 1 | 2600 | 3100 |
| 80:20-$N_2$:$O_2$ | 10 | 2050 | 3500 |
| 80:20-$N_2$:$O_2$ | 50 | 1800 | 3750 |
| 50:50-$N_2$:$O_2$ | 1 | 2250 | 3000 |
| 50:50-$N_2$:$O_2$ | 10 | 1750 | 3500 |
| 50:50-$N_2$:$O_2$ | 50 | 1500 | 3750 |

The energy consumption decreases by approx. 20% when increasing the pressure from 1 bar to 10 bar, and an additional approx. 10% when the pressure is increased to 50 bar. At a pressure above 100 bar the effect is less pronounced, and the energy consumption curves level off.

FIG. 4 illustrates further results from the simulation being the energy cost, i.e. energy consumption, per NO formed from $O_2$ and $N_2$ as a function of temperature at two different pressures: 0.05 bar and 50 bar, for the two gas mixtures. The lines representing the stochiometric gas mixture are dashed and the lines representing the gas mixture similar to air are unbroken. The lines of regular thickness are displaying the energy consumption at 0.05 Bar, while the bold lines are displaying the energy consumption at 50 Bar. As displayed in FIG. 4, the formation of NO also occurs at lower temperatures than the ones presented in FIG. 3, but with a higher energy cost per NO formed, which results in a lower yield.

In Table 2 the data for the energy consumption for the formation of NO at 2300 K from both gas mixtures are presented at the two different pressures: 0.05 bar and 50 bar.

TABLE 2

Energy consumptions for the formation of NO from $N_2$ and $O_2$ at 0.05 bar and 50 bar.

| Gas mixture (vol/vol ratio) | Pressure (bar) | Energy consumption for formation of NO (kJ/mol) | Temperature (K) |
|---|---|---|---|
| 80:20-$N_2$:$O_2$ | 0.05 | 4750 | 2300 |
| 80:20-$N_2$:$O_2$ | 50 | 4500 | |
| 50:50-$N_2$:$O_2$ | 0.05 | 3900 | |
| 50:50-$N_2$:$O_2$ | 50 | 3600 | |
| 80:20-$N_2$:$O_2$ | 0.05 | 4000 | 2500 |
| 80:20-$N_2$:$O_2$ | 50 | 3550 | |
| 50:50-$N_2$:$O_2$ | 0.05 | 3350 | |
| 50:50-$N_2$:$O_2$ | 50 | 2900 | |

The energy consumption decreases with approx. 10% when increasing the pressure from 0.05 bar to 50 bar at both 2300 K and 2500 K for the stochiometric gas mixture. For the gas mixture similar to air the energy consumption decreases with approx. 5% at 2300 K and approx. 10% at 2500 K. There is, thus, a pronounced reduction in energy efficiency at temperatures below the temperature wherein the energy consumption is optimized.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for the synthesis of nitrogen oxides ($NO_x$) comprising the steps of:

providing a gas mixture comprising oxygen and nitrogen; and heating the gas mixture to a temperature of at least 2300 K at a pressure of 10-100 bar in a thermal reactor forming a gas mixture comprising $NO_x$;

wherein the method includes a step of quenching the gas mixture comprising $NO_x$, and the quenching is conducted by bringing the gas mixture in contact with a quenching medium being water or a gas mixture comprising oxygen and nitrogen.

2. The method according to claim 1, wherein the thermal reactor is a plasma reactor.

3. The method according to claim 1, wherein the gas mixture comprising oxygen and nitrogen has an oxygen content of 25-60% (vol/vol).

4. The method according to claim 1, wherein the thermal reactor is operated by heating the gas mixture comprising oxygen and nitrogen with radiofrequency waves or microwaves.

5. The method according to claim 1, further comprising a step of:

cooling the gas mixture in a cooling step forming a cooled gas mixture comprising $NO_2$, wherein the cooling step comprises quenching the gas mixture comprising $NO_x$.

6. The method according to claim 5, wherein the quenching medium gas mixture comprises oxygen, nitrogen and NO recirculated from the cooling step, and/or oxygen and nitrogen that was deliberately by-passed around the thermal reactor.

7. The method according to claim 5, further comprising the step of depressurizing the cooled gas mixture comprising $NO_2$.

8. The method according to claim 5, further comprising a step of:

extracting energy during the cooling step forming a cooled gas mixture comprising $NO_2$.

9. The method according to claim 8, wherein at least part of the extraction of energy is conducted in a turbine system, wherein the turbine system preferably comprises a cooler or condenser.

10. The method according to claim 8, wherein at least part of the extraction of energy is conducted by leading the gas mixture into a heat-exchanger, wherein the heat-exchanger preferably generates steam that can be recovered in a steam turbine.

11. The method according to claim 1, further comprising a step of wet scrubbing the gas mixture comprising $NO_2$ thereby forming nitric acid ($HNO_3$).

12. The method according to claim 1, wherein unreacted exhaust gas is recirculated from the wet scrubbing to the thermal reactor.

13. The method according to claim 1, wherein the gas mixture comprising oxygen and nitrogen is heated to a temperature of at least 2300 K at a pressure of 15-70 bar.

14. A method for the synthesis of nitric acid ($HNO_3$) comprising the following steps:

providing a gas mixture comprising oxygen and nitrogen;

heating the gas mixture to a temperature of at least 2300 K at a pressure of 10-100 bar in a thermal reactor forming a gas mixture comprising $NO_x$;

cooling the gas mixture in a cooling step forming a cooled gas mixture comprising $NO_2$, wherein the cooling step comprises quenching the gas mixture comprising $NO_x$, and the quenching is conducted by bringing the gas mixture in contact with a quenching medium being water or a gas mixture comprising oxygen and nitrogen;

optionally, depressurizing the cooled gas mixture comprising $NO_2$;

wet scrubbing the gas mixture comprising $NO_2$ thereby forming $HNO_3$; and optionally, recirculating unreacted exhaust gas from the wet scrubbing to the thermal reactor.

* * * * *